Jan. 18, 1966  G. K. OSS  3,229,635
ROCKET NOZZLE DIAPHRAGM SEAL
Filed Feb. 12, 1964

INVENTOR
GEORGE K. OSS

BY Claude Funkhouser
ATTORNEY

United States Patent Office
3,229,635
Patented Jan. 18, 1966

3,229,635
ROCKET NOZZLE DIAPHRAGM SEAL
George K. Oss, Springfield, Va., assignor, by mesne assignments, to the United States of America as represented by the Secretary of the Navy
Filed Feb. 12, 1964, Ser. No. 344,509
2 Claims. (Cl. 102—49)

This invention relates to a rocket nozzle diaphragm seal and is more particularly adapted to seal the rocket nozzle ends of a missile of the type which is fired from underwater and which will burst with any build-up of combustion pressure within the nozzle.

The sealing of a rocket nozzle of the type used in the Polaris missile provides difficulties beyond a mere sealing operation. The diaphragm seal must be sufficiently tight to withstand the exterior pressure to which the nozzle is subjected when in its housing. This pressure varies with the depth at which the submarine is located at the moment previous to firing, when the hatch cover is removed. It must be capable of instant blow-out when the build-up of pressure within the nozzle from the combustion chamber exceeds a predetermined pressure. The diaphragm seal must be of the type which is easily applicable to the nozzle and, when used in combination with an internal plug fitting, the nozzle provides an effective seal under certain predetermined pressures to effectively prevent the water from entering the combustion chamber through the nozzle and yet be subjected to blow-out so that the exhaust area is unencumbered by fragments of the seal.

An object of the present invention is to provide an effective elastic diaphragm type seal adapted to fit over the nozzle of a rocket motor to effectively seal the rocket nozzle against an exterior predetermined pressure and to rupture along a predetermined pattern upon the build-up of internal pressure within the nozzle.

Another object of the present invention is to provide an elastic diaphragm seal for a rocket nozzle having an integral substantially O-shaped rim adapted to engage the outer surface of the nozzle in sealing relationship.

A further object of the present invention is to provide a diaphragm elastic seal for a rocket nozzle and to form integral with the seal a substantially O-shaped sealing rim attached to the diaphragm by a web not exceeding 25° of arc of the circumferenme of the O-shaped rim.

It is still a further object of the present invention to provide an elastic diaphragm seal formed with a substantially circular reinforcing member centrally located with regard to the diaphragm seal and nozzle to provide an effective blow-out which upon the build-up of pressure within the nozzle will rupture along the edge of the reinforcing member and leave the nozzle free and clear of all obstructions.

It is a further object of the present invention to provide an elastic diaphragm seal for a rocket nozzle, said seal being scored to provide a substantially centrally located portion weakened by said scored lines which, upon the build-up of pressure within the nozzle due to combustion gases, will rupture along said scored lines and leave the nozzle free and clear of all obstructions.

Other objects, advantages and novel features of the invention will become apparent from the following detailed description of the invention when considered in conjunction with the accompanying drawings wherein.

Referring particularly to the drawings wherein like numerals designate like parts as shown in the several figures, a rocket nozzle 12 is shown with the internal plug, which supports and reinforces the diaphragm seal against external pressure, omitted, and with a diaphragm seal 13 applied to its end. The nozzle is of the type generally used for rocket motors for missiles of the Polaris type and has an annular groove 14 formed on its outside surface. The details of construction of this nozzle, which permits it to swivel so that the exhaust gas may be directed at any desired angle, are omitted as they form no part of the present invention, as the outline of the nozzle is considered sufficient to show the application of a diaphragm seal thereto.

Figure 2:
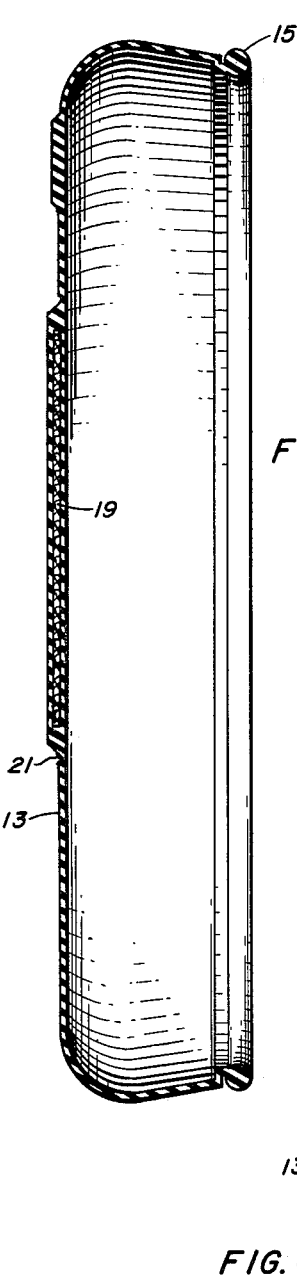
FIG. 2 is a cross-sectional view of the diaphragm.
Figure 1:
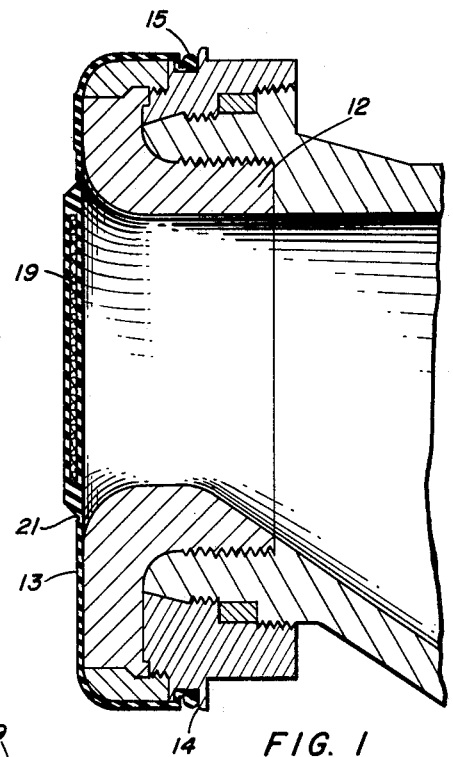
FIG. 1 is a cross-sectional view of the diaphragm in position on a nozzle.
Figure 4:
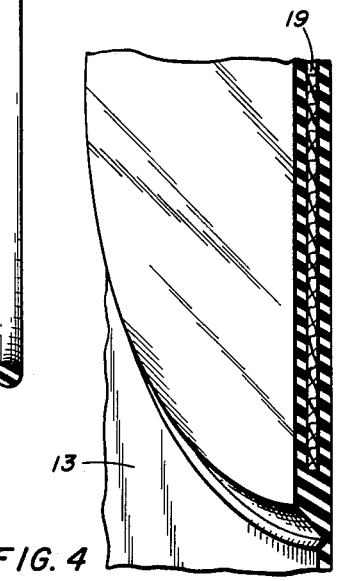
FIG. 4 is a cross-sectional view of the reinforcing patch.
Figure 3:
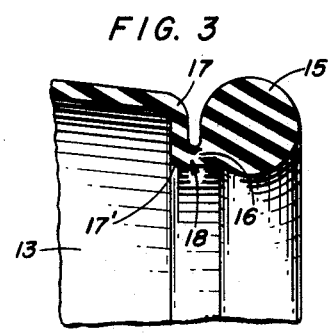
FIG. 3 is a cross-sectional detailed view of the sealing edge of the diaphragm.

The diaphragm seal is formed from material having elastic properties such as rubber and is adapted to be stretched into position. It is formed with an integral rim 15 in the shape of an O-ring, shown in an enlarged detail in FIG. 3. This O-ring 15 is attached to the cap by webbing 18 which connects to the circumference of the O-rim by an arc not exceeding 25° of the circumference of the cross section of the rim. This webbing between the cap 13 proper is formed with two substantially right angle bends 17 and 17', respectively, the bend 17 being slightly more than 90° and the bend 17' beng more acute than 90° so that the point of attachment to the rim is such that the O-shaped rim is seated within the groove 14 so as to present a sealing O-shaped surface both to the groove and to possible exterior contact with any cylindrical object such as a covering cap which may be used to provide an additional seal. This particular shape in which the web is attached to the O-shaped rim provides an effective internal and external seal substantially the same as a completely free O-ring.

The diaphragm seal extends across the end of the nozzle and has secured thereto a reinforcing patch 19 which is substantially the same diameter as the exhaust outlet of the nozzle and reinforces the diaphragm to provide a substantially weaker portion surrounding the edges of the reinforced patch. This reinforcing patch, which may be formed of a non-elastic material such as cloth, insures an effective blow-out pattern so that upon the build-up of pressure from the combustion gas within the nozzle, the seal will rupture adjacent the edges of the reinforcing patch and will blow-out leaving an exhaust passage completely free and clear of any fragments of the diaphragm seal.

The diaphragm seal may be provided with scored cuts 21 which coincide with the edge of the reinforcing patch. This insures a clear cut break along the scored lines when the seal is subjected to internal pressure of a predetermined degree.

Obviously many modifications and variations of the present invention are possible in the light of the above teachings. It is therefore to be understood that within the scope of the appended claims the invention may be practiced otherwise than as specifically described.

What is claimed is:
1. A diaphragm seal for the nozzle of a rocket motor, said nozzle being formed with an exterior annular groove adjacent its end, said diaphragm comprising:
    a cup shaped elastic member adapted to cover the end of the nozzle;

a rim, integral with said cup shaped elastic member, said rim having a circular cross section and formed with a web connecting said rim with said cup shaped member, said web at the point of attachment to the rim not exceeding in width more than 25° of arc of the cross sectional circumference of the rim, said rim being seated in the external groove of the nozzle to provide water tight sealing relation.

2. A diaphragm seal according to claim 1 and including a central reinforcing section formed integral with the cup-shaped member.

References Cited by the Examiner
UNITED STATES PATENTS

| 2,645,999 | 7/1953 | Bigard | 102—49 |
| 3,123,250 | 3/1964 | Lemmer | 220—89 |

BENJAMIN A. BORCHELT, *Primary Examiner.*

SAMUEL FEINBERG, *Examiner.*

V. R. PENDEGRASS, *Assistant Examiner.*